United States Patent [19]
Van Rens

[11] 3,904,330
[45] Sept. 9, 1975

[54] LUBRICATING SYSTEM FOR ROTARY INTERNAL COMBUSTION ENGINE

[75] Inventor: Russell J. Van Rens, Kenosha, Wis.
[73] Assignee: Outboard Marine Corporation, Waukegan, Ill.
[22] Filed: Feb. 20, 1974
[21] Appl. No.: 444,042

[52] U.S. Cl.............................. 418/100; 123/8.01
[51] Int. Cl.² ........................................ F01C 21/04
[58] Field of Search........ 123/8.01, 196 W, 196 CP; 418/98, 100, 97, 99, 83, 87; 184/15 R

[56] References Cited
UNITED STATES PATENTS

| | | | |
|---|---|---|---|
| 1,380,018 | 5/1921 | Petsche | 418/97 |
| 2,713,336 | 7/1955 | Quick | 123/196 CP |
| 3,140,700 | 7/1964 | Nallinger | 123/8.01 |
| 3,180,323 | 4/1965 | Paschke | 123/8.01 |
| 3,424,135 | 1/1969 | Tado | 418/100 |

*Primary Examiner*—William L. Freeh
*Assistant Examiner*—O. T. Sessions
*Attorney, Agent, or Firm*—Michael, Best & Friedrich

[57] ABSTRACT

Disclosed herein is a rotary internal combustion engine comprising a housing assembly defining a rotor cavity including a peripheral wall and an inlet for admitting a fuel-lubricant mixture into said rotor cavity, a rotor located for rotation in the cavity and including a plurality of apex portions in engagement with the peripheral wall so as to create in the cavity and in response to rotor rotation a substantially sealed rotating chamber which, during one portion of the rotor rotational cycle, increases in volume so as to provide inflow through the fuel inlet and into the rotating chamber of a fuel-lubricant mixture, which, during a second portion of the rotor rotational cycle subsequent to the first cycle portion, decreases in volume to compress the fuel-lubricant mixture in the rotating chamber, and which, during a third portion of the rotor rotational cycle subsequent to the second cycle portion, increases in volume in response to fuel ignition in the rotating chamber, an area to be lubricated, and means operable in response to the compression of the fuel-lubricant mixture during the second portion of the rotor rotational cycle for pumping fuel-lubricant mixture from the rotating chamber in the rotor cavity to the area to be lubricated.

7 Claims, 2 Drawing Figures

LUBRICATING SYSTEM FOR ROTARY INTERNAL COMBUSTION ENGINE

BACKGROUND OF THE INVENTION

The invention relates generally to rotary internal combustion engines including a housing assembly defining a rotor cavity including a peripheral wall and a fuel inlet for supplying a fuel-lubricant mixture to the rotor cavity, together with a rotor located for rotation in the cavity and including a plurality of apex portions in engagement with the peripheral wall to as to create, in the cavity and in response to rotor rotation, a substantially sealed, rotating chamber which varies in volume in response to rotor rotation and which, during one portion of the rotor rotational cycle, increases in volume so as to provide inflow through the fuel inlet and into the rotating chamber of the fuel-lubricant mixture and which, during a second portion of the rotor rotational cycle subsequent to the first cycle portion, decreases in volume to compress the fuel-lubricant mixture in the rotating chamber and which, during a third portion of the rotor rotational cycle subsequent to the second cycle portion, increases in volume in response to fuel ignition in the rotating chamber.

The invention also relates to arrangements for supplying lubricant, in a rotary internal combustion engine, to areas to be lubricated and, in particular, to one or more bearings for the crankshaft which carries the rotor.

SUMMARY OF THE INVENTION

The invention provides means operable, in response to compression of the fuel-lubricant mixture in the rotating chamber generated by rotation of the rotor in the cavity, for pumping fuel-lubricant mixture from the rotating chamber to an area to be lubricated and, in particular, to one or more of the crankshaft bearings.

In one preferred embodiment of the invention, there is provided a duct located, at least in part, in the housing assembly and communicating with the area to be lubricated and with the rotor cavity so as to provide communication with tne rotating chamber during the compression portion of the rotor rotational cycle. In particular, the duct preferably communicates with the cavity through the peripheral wall approximately midway between the spark plug and the fuel inlet.

In still further accordance with the invention, there is provided a restriction in the duct to prevent undesired reduction of the compression pressure in the rotating chamber.

One of the principal features of the invention is an arrangement in a rotary internal combustion engine for supplying lubricant to an area to be lubricated in response to pressure generation in the rotating chamber during the compression portion of the cycle.

Another of the principal features of the invention is the provision of a rotary internal combustion engine in which lubrication is supplied to one or more of the crankshaft bearings from the incoming charge of fuel-lubricant mixture and in response to compression of the charge in the rotating chamber.

Another of the principal features of the invention is the provision in a rotary internal combustion engine of a lubrication supply system which utilizes the incoming charge of fuel-lubricant mixture and which is economical to construct and reliable in operation.

Other objects and advantages of the invention will become known by reference to the following drawings, general description, and claims.

DRAWINGS

Figure 1:
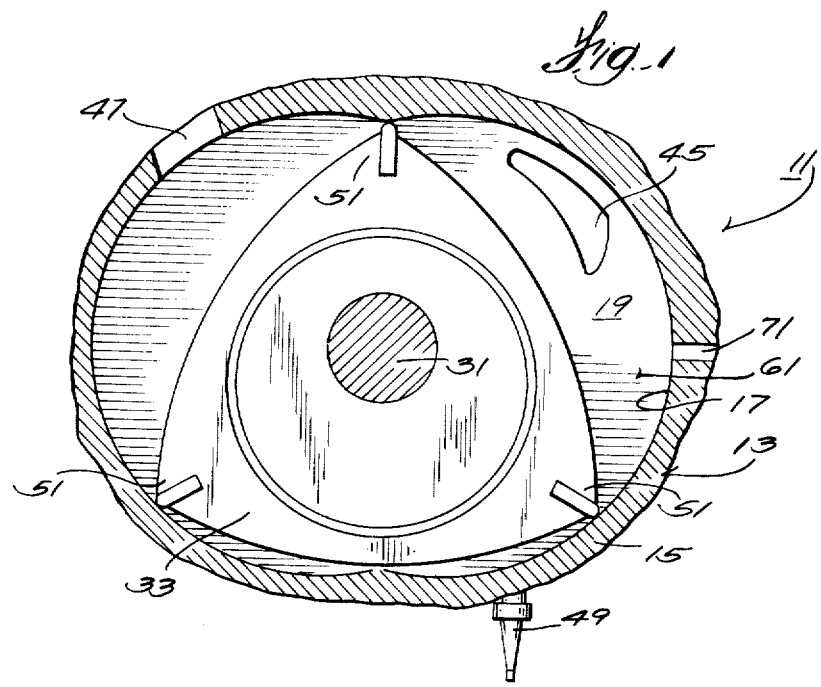
FIG. 1 is a fragmentary and partially schematic view of a rotary internal combustion engine embodying various of the features of the invention.
Figure 2:
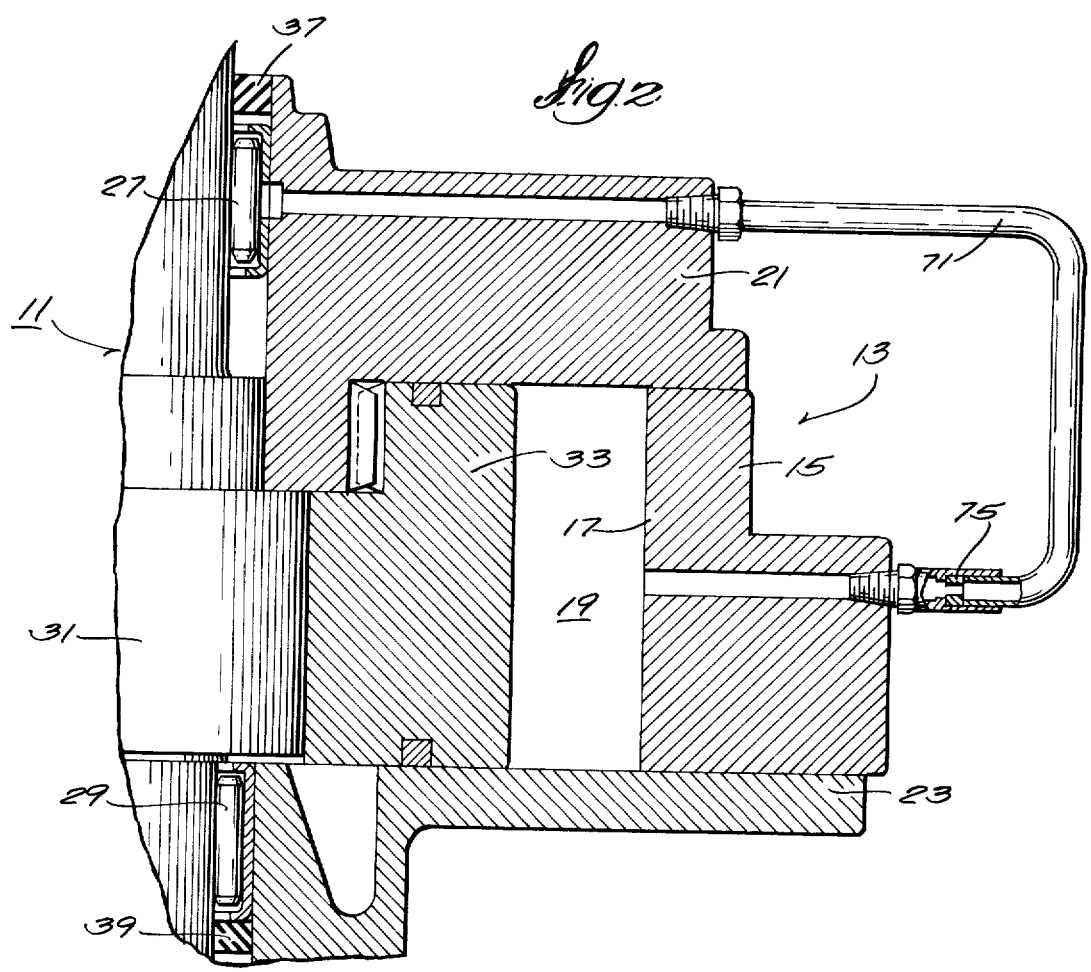
FIG. 2 is an enlarged, fragmentary, and partially schematic cross sectional view of the engine shown in FIG. 1.

Before explaining the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in the drawings is a rotary internal combustion engine 11 which includes a housing assembly or block 13 comprising a housing member 15 having an internal peripheral wall 17 partially defining a substantially closed rotor cavity 19, together with opposed end walls 21 and 23 which are suitably connected to the housing member 15 and which complete the housing cavity 19. Provided in the housing assembly 13 are spaced crankshaft bearings 27 and 29 which rotatably support a crankshaft 31 which, in turn, supports a rotor 33 for rotation relative to the crankshaft 31 and within and relative to the cavity 19 about an axis located in eccentric relation to the crankshaft axis. Spaced seals 37 and 39 are provided around the crankshaft 31 axially outwardly of the spaced crankshaft bearings 27 and 29.

Also included in the housing assembly 13 is an inlet port 45 for admitting a charge of fuel-lubricant mixture and an exhaust port 47 for discharging spent combustion gases. In addition, a spark plug 49 is located in the housing member 15 and communicates with the cavity 19 to cause combustion of the fuel in the cavity.

The rotor 33 includes a plurality of apex portions 51 which sealingly engage the peripheral wall 17 defining the cavity 19 so as to produce, during rotation of the rotor 33 within the cavity 19, a substantially sealed and rotating chamber 61 which varies in volume and pressure as the rotor 33 rotates. Specifically, during one portion of the rotor rotational cycle, the chamber 61 increases in volume so as to provide inflow of fuel-lubricant mixture into the moving chamber 61. During a second portion of the rotor rotational cycle subsequent to the first cycle portion, the chamber 61 decreases in volume to compress the fuel-lubricant mixture therein. During a third portion of the rotor rotational cycle subsequent to the second cycle portion, the chamber 61 increases in volume in response to fuel ignition by the spark plug 49. As thus far described, the construction is conventional and is believed to be well known to those having ordinary skill in the design of rotary combustion engines. However, the invention is not limited to the foregoing specifically described constructional details.

In accordance with the invention, means are provided for pumping lubricant from the incoming charge of fuel-lubricant mixture to one or more of the crankshaft bearings 27 and 29, or other area of the engine 11 to be lubricated, and in response to the pressure variation occurring in the rotating chamber 61, and more particularly, in response to the compression in the moving chamber 61 which takes place during the beforementioned second portion of the rotor rotational cycle.

Still more particularly in accordance with the invention, such means includes a conduit or duct 71 extending, in whole or in part, in the housing assembly 13 and communicating with the bearing 27 or other area to be lubricated and with the cavity 19 so as to provide communication with the moving chamber 61 during the second portion of the rotor rotational cycle, i.e., when the fuel-lubricant charge is being compressed. Thus, such compression serves also to pump lubricant to the bearing 27 or other area to be lubricated.

In still further accordance with the invention, means are provided for regulating, metering, or restricting the quantity of fuel-lubricant charge flowing through the duct or conduit 71 to the bearing 27 or other area to be lubricated and thereby also to maintain desirable compression pressure levels in the moving chamber 61. While various other constructions can be employed, in the illustrated construction, the duct 71 is provided with a restricted, sharp-edged orifice 75 which regulates the fluid flow therethrough substantially independently of the pressure and without permitting excessive loss of pressure from the moving chamber 61.

In the specifically illustrated construction, the duct 71 communicates with the bearing 27 and with the cavity 19, through the peripheral wall 17, in an area approximately midway between the spark plug 49 and the fuel inlet 45. While a period of lesser pressure occurs after each compression cycle in the area of the cavity 19 adjacent to the duct 71, the lesser pressure, as compared to the compression pressure, is insufficient to withdraw lubricant through the orifice 75 and through the duct 71 from the area to which lubricant is pumped.

In operation, the compression which occurs during the second portion of the rotor rotational cycle causes a portion of the charge of fuel-lubricant mixture to be pumped through the conduit 71 and through the sharp-edged orifice 75 to the bearing 27 for lubrication thereof.

Various of the features of the invention are set forth in the following claims.

What is claimed is:

1. A rotary internal combustion engine comprising a housing assembly defining a rotor cavity including a peripheral wall and an inlet for admitting a fuel-lubricant mixture into said rotor cavity, a rotor including a plurality of apex portions, means located on said housing assembly and supporting said rotor for rotation in said cavity with said apex portions in engagement with said peripheral wall so as to create in said cavity and in response to rotor rotation a substantially sealed moving chamber which, during one portion of the rotor rotational cycle, increases in volume so as to provide inflow of fuel-lubricant mixture into said chamber, which, during a second portion of the rotor rotational cycle subsequent to the first cycle portion, decreases in volume to compress the fuel-lubricant mixture in said chamber, and which, during a third portion of the rotor rotational cycle subsequent to the second cycle portion, increases in volume in response to fuel ignition in said chamber, an area on said engine to be lubricated, and means operable in response to the compression of the fuel-lubricant mixture during the second portion of the rotor rotational cycle for pumping fuel-lubricant mixture from said moving chamber in said cavity to said area to be lubricated.

2. A rotary internal combustion engine in accordance with claim 1 wherein said fuel-lubricant mixture pumping means comprises a duct partially located in said housing assembly and communicating with said area to be lubricated and with said cavity so as to provide communication with said moving chamber during the second portion of the rotor rotational cycle.

3. A rotary internal combustion engine in accordance with claim 2 and further including means for restricting flow in said duct.

4. A rotary internal combustion engine in accordance with claim 3 wherein said flow restricting means comprises a sharp-edged orifice.

5. A rotary internal combustion engine in accordance with claim 2 and further including a spark plug mounted in said housing assembly and communicating with said cavity and wherein said duct communicates with said cavity approximately midway between said spark plug and said inlet.

6. A rotary internal combustion engine comprising a housing assembly defining a rotor cavity including a peripheral wall, an inlet for admitting into said rotor cavity a fuel-lubricant mixture, and a spark plug communicating with said cavity in spaced relation from said inlet, a rotor including a plurality of apex portions, bearing means located on said housing assembly and supporting said rotor for rotation in said cavity with said apex portions in engagement with said peripheral wall so as to create in said cavity and in response to rotor rotation a substantially sealed moving chamber which, during one portion of the rotor rotational cycle, increases in volume so as to provide inflow of fuel-lubricant mixture into said chamber, which, during a second portion of the rotor rotational cycle subsequent to the first cycle portion, decreases in volume to compress the fuel-lubricant mixture in said chamber, and which, during a third portion of the rotor rotational cycle subsequent to the second cycle portion, increases in volume in response to fuel ignition in said chamber, a duct located in said housing assembly and communicating through said peripheral wall with said cavity approximately midway between said spark plug and said inlet so as to provide communication with said moving chamber during said second portion of the rotor rotational cycle, said duct also communicating with said bearing means, and flow restricting means in said duct limiting outflow of lubricant to said bearing means.

7. A rotary internal combustion engine in accordance with claim 6 wherein said flow restricting means comprises a sharp-edged orifice.

* * * * *